US012542608B2

(12) United States Patent
Lv et al.

(10) Patent No.: US 12,542,608 B2
(45) Date of Patent: Feb. 3, 2026

(54) INFORMATION TRANSMISSION METHOD AND COMMUNICATION APPARATUS

(71) Applicant: HUAWEI TECHNOLOGIES CO., LTD., Guangdong (CN)

(72) Inventors: Yibo Lv, Dongguan (CN); Xu Li, Shenzhen (CN); Junping Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 417 days.

(21) Appl. No.: 18/158,762

(22) Filed: Jan. 24, 2023

(65) Prior Publication Data

US 2023/0163847 A1    May 25, 2023

Related U.S. Application Data

(63) Continuation of application No. PCT/CN2021/103652, filed on Jun. 30, 2021.

(30) Foreign Application Priority Data

Jul. 28, 2020    (CN) ........................ 202010737273.X

(51) Int. Cl.
*H04B 10/11*    (2013.01)
(52) U.S. Cl.
CPC .................... *H04B 10/11* (2013.01)
(58) Field of Classification Search
CPC ...................................... H04B 10/11
USPC ......................................... 398/118
See application file for complete search history.

(56) References Cited

U.S. PATENT DOCUMENTS

| 9,136,870 | B2 | 9/2015 | Lee | |
|---|---|---|---|---|
| 10,409,968 | B2* | 9/2019 | Mitsunaga | .............. G07D 9/00 |
| 10,476,599 | B2* | 11/2019 | Wang | ................... H04B 10/532 |
| 2013/0071107 | A1 | 3/2013 | Kwon et al. | |
| 2017/0041069 | A1* | 2/2017 | Jeong | ................... H04B 10/516 |
| 2017/0110070 | A1* | 4/2017 | Ikeda | ................... G09G 3/3426 |
| 2018/0091225 | A1 | 3/2018 | Wang et al. | |

(Continued)

FOREIGN PATENT DOCUMENTS

| CN | 103067708 | A | * | 4/2013 | |
|---|---|---|---|---|---|
| CN | 104753595 | A | * | 7/2015 | |
| CN | 108281125 | A | * | 7/2018 | .............. G09G 5/10 |

(Continued)

OTHER PUBLICATIONS

Rajagopal et al., "IEEE 802.15.7 visible light communication: modulation schemes and dimming support," IEEE Communications Magazine, vol. 50, No. 3, Mar. 2012, 11 pages.

(Continued)

*Primary Examiner* — Amritbir K Sandhu
(74) *Attorney, Agent, or Firm* — Fish & Richardson P.C.

(57) ABSTRACT

This application provides information transmission methods and apparatuses. In an implementation, a method comprising determining a data packet, wherein the data packet comprises a first information sequence and a second information sequence, the first information sequence comprises source information, the second information sequence comprises partial source information of the source information for performing luminance control on a light source, and outputting the data packet by using the light source.

17 Claims, 12 Drawing Sheets

(56) References Cited

U.S. PATENT DOCUMENTS

2018/0204539 A1* 7/2018 Yang ..................... G06F 1/1677

FOREIGN PATENT DOCUMENTS

| CN | 108900249 A | | 11/2018 |
|---|---|---|---|
| JP | 4292658 B2 | * | 7/2009 |
| JP | 2017017038 A | * | 1/2017 |
| JP | 2018077488 A | * | 5/2018 |

OTHER PUBLICATIONS

Hong et al., "Photon-Counting Underwater Optical Wireless Communication for Reliable Video Transmission Using Joint Source—Channel Coding Based on Distributed Compressive Sensing," Sensors, vol. 19, No. 5, 12 pages, Mar. 2019.

Sarbazi et al., "PHY layer performance evaluation of the IEEE 802.15.7 visible light communication standard," 2013 2nd International Workshop on Optical Wireless Communications (IWOW), Oct. 21-21, 2013, 5 pages.

Kim et al., "A Coding Scheme for Visible Light Communication With Wide Dimming Range," IEEE Photonics Technology Letters, vol. 26, No. 5, Mar. 1, 2014, 4 pages.

Zuo et al., "A Novel Coding Based Dimming Scheme with Constant Transmission Efficiency in VLC Systems," Applied Sciences, Jan. 24, 2019, 7 pages.

International Search Report and Written Opinion in International Appln. No. PCT/CN2021/103652, mailed on Sep. 10, 2021, 17 pages (with English translation).

Extended European Search Report in European Appln. No. 21849882.2, mailed on Dec. 7, 2023, 11 pages.

* cited by examiner

INFORMATION TRANSMISSION METHOD AND COMMUNICATION APPARATUS

CROSS-REFERENCE TO RELATED APPLICATIONS

This application is a continuation of International Application No. PCT/CN2021/103652, filed on Jun. 30, 2021, which claims priority to Chinese Patent Application No. 202010737273.X, filed on Jul. 28, 2020. The disclosures of the aforementioned applications are hereby incorporated by reference in their entireties.

TECHNICAL FIELD

This application relates to the communication field, and more specifically, to an information transmission method and a communication apparatus.

BACKGROUND

In a visible light communication (VLC) system, which is a subcategory of an optical wireless communication (OWC) system, a white-light light-emitting diode (LED) lamp is selected as an illuminating light source and a signal emission source, to implement functions of illumination and communication at low costs. The VLC system needs to be able to provide stable and reliable illumination and communication services in various scenarios (for example, in a shopping mall, an office building, a museum, a vicinity of a street lamp, a billboard, a playground, and a transportation vehicle) and environments (for example, at daytime, at night, and in rainy days). This poses requirements on luminance adjustability and communication reliability of the VLC system.

Therefore, how to ensure both the luminance adjustability and communication reliability of the VLC system becomes an issue that needs to be addressed urgently.

SUMMARY

This application provides an information transmission method and a communication apparatus, which can ensure both luminance adjustability and communication reliability of a VLC system.

According to a first aspect, this application provides an information transmission method. The method includes: determining a to-be-sent data packet, where the data packet includes a first information sequence and a second information sequence, the first information sequence includes source information, the second information sequence includes partial source information of the source information, and the second information sequence is used to perform luminance control on a light source; and outputting the data packet by using the light source.

In this application, original source information and information that is obtained by performing source encoding on the original source information are collectively referred to as the source information. In other words, the source information may be the original source information, may be the information that is obtained by performing source encoding, or may be a combination of at least partial original source information and at least partial information that is obtained by performing source encoding.

In the foregoing technical solution, the partial source information is used for luminance control. This can ensure to implement luminance adjustability of a VLC system. A transmit end additionally transmits the partial source information to a receive end, so that the receive end can obtain more information for restoring the original source information. This is conducive to decoding of the data packet, thereby improving communication reliability of the VLC system.

With reference to the first aspect, in a possible implementation, the determining a to-be-sent data packet includes: obtaining the first information sequence; determining the second information sequence based on the first information sequence, a preset luminance ratio, and the partial source information; and determining the data packet based on the first information sequence and the second information sequence.

In the foregoing technical solution, the preset luminance ratio may be a luminance ratio required by the VLC system, thereby ensuring that a luminance change of the light source is imperceptible to a user during data transmission.

With reference to either of the first aspect or the foregoing possible implementation, in another possible implementation, the determining the second information sequence based on the first information sequence, a preset luminance ratio, and the partial source information includes: determining, based on a quantity of 1s in the first information sequence, a quantity of 0s in the first information sequence, and the luminance ratio, a quantity of 1s to be supplemented and a quantity of 0s to be supplemented; and determining the second information sequence based on the quantity of 1s to be supplemented, the quantity of 0s to be supplemented, and the partial source information, where the second information sequence is used to supplement the 1s to be supplemented and the 0s to be supplemented.

With reference to any one of the first aspect or the foregoing possible implementations, in another possible implementation, the method further includes: chunking the source information, to obtain at least one subblock; and selecting at least one target subblock from the at least one subblock based on a quantity of 1s in each of the at least one subblock, a quantity of 0s in each subblock, the quantity of 1s to be supplemented, and the quantity of 0s to be supplemented, where the at least one target subblock includes the partial source information.

In the foregoing technical solution, the source information is chunked, and the at least one target subblock is extracted from each obtained block for supplementing 0s and 1s, to adjust a ratio of 0s to 1s in the entire data packet. The partial source information is used for luminance control. This can ensure to implement luminance adjustability of the VLC system. A transmit end additionally transmits the partial source information to a receive end, so that the receive end can obtain more information for restoring the original source information. This is conducive to decoding of the data packet, thereby improving communication reliability of the VLC system.

With reference to any one of the first aspect or the foregoing possible implementations, in another possible implementation, the data packet further includes a synchronization sequence, a ratio of 0s to 1s in the source information, and packet header information, where the packet header information includes a sequence number of each of the at least one target subblock and/or a quantity of the at least one target subblock.

In the foregoing technical solution, information such as the ratio of 0s to 1s in the source information and the sequence number of each of the at least one target subblock and/or the quantity of the at least one target subblock is added to the data packet. This is conducive for the receive end to restore the original source information.

With reference to any one of the first aspect or the foregoing possible implementations, in another possible implementation, the obtaining the first information sequence includes: obtaining the source information; and performing source encoding and channel encoding on the source information to obtain the first information sequence.

In the foregoing technical solution, the first information sequence is information obtained after source encoding and channel encoding. This is conducive to improving the communication reliability of the VLC system.

With reference to any one of the first aspect or the foregoing possible implementations, in another possible implementation, the performing source encoding on the source information includes: performing at least one type of the following processing on the source information: discrete cosine transform processing, quantizing processing, sorting processing, and compression processing; or performing a matrix multiplication operation on the source information and a compression matrix.

With reference to any one of the first aspect or the foregoing possible implementations, in another possible implementation, the source information is image information.

According to a second aspect, this application provides an information transmission method. The method includes: obtaining a data packet transmitted by a light source, where the data packet includes a first information sequence and a second information sequence, the first information sequence includes source information, the second information sequence includes partial source information of the source information, and the second information sequence is used to assist in decoding; and decoding the data packet by using a joint source-channel decoding method.

In this application, original source information and information that is obtained by performing source encoding on the original source information are collectively referred to as the source information. In other words, the source information may be the original source information, may be the information that is obtained by performing source encoding, or may be a combination of at least partial original source information and at least partial information that is obtained by performing source encoding.

In the foregoing technical solution, a transmit end additionally transmits the partial source information to the receive end, so that the receive end can obtain more information for restoring the original source information. This is conducive to decoding of the data packet, thereby improving communication reliability of a VLC system.

With reference to the second aspect, in possible implementation, the data packet further includes a synchronization sequence, a ratio of 0s to 1s in the source information, and packet header information, where the packet header information includes a sequence number of each of at least one target subblock and/or a quantity of the at least one target subblock, and the at least one target subblock includes the partial source information.

In the foregoing technical solution, information such as the ratio of 0s to 1s in the source information and the sequence number of each of the at least one target subblock and/or the quantity of the at least one target subblock is added to the data packet. This is conducive for the receive end to restore the original source information.

With reference to either of the second aspect or the foregoing possible implementation, in another possible implementation, the source information is image information.

According to a third aspect, this application provides a communication apparatus. The communication apparatus has a function to implement the method according to any one of the first aspect or the possible implementations of the first aspect, or has a function to implement the method according to any one of the second aspect or the possible implementations of the second aspect. The function may be implemented by hardware, or may be implemented by hardware executing corresponding software. The hardware or the software includes one or more units corresponding to the foregoing function.

According to a fourth aspect, this application provides a communication apparatus, including a processor, a memory, and a transceiver. The memory is configured to store a computer program. The processor is configured to call and run the computer program stored in the memory, and control the transceiver to send and receive signals, so that the communication apparatus performs the method according to any one of the first aspect or the possible implementations of the first aspect or the method according to any one of the second aspect or the possible implementations of the second aspect.

According to a fifth aspect, this application provides a communication apparatus, including a processor and a communication interface. The communication interface is configured to receive a signal and transmits the received signal to the processor. The processor processes the signal, so that the method according to any one of the first aspect or the possible implementations of the first aspect or the method according to any one of the second aspect or the possible implementations of the second aspect is performed.

Optionally, the communication interface may be an interface circuit, and the processor may be a processing circuit.

According to a sixth aspect, this application provides a chip, including a logical circuit and a communication interface. The logical circuit is configured to perform the determining processing in any one of the first aspect or the possible implementations of the first aspect, to obtain the to-be-sent data packet in any one of the first aspect or the possible implementations of the first aspect. The communication interface is configured to output the data packet.

Optionally, the communication interface may include an input interface and an output interface. The output interface is configured to output the data packet.

According to a seventh aspect, this application provides a chip, including a logical circuit and a communication interface. The communication interface is configured to obtain the data packet in any one of the second aspect or the possible implementations of the second aspect. The logical circuit is configured to perform decoding processing in any one of the second aspect or the possible implementations of the second aspect.

Optionally, the communication interface may include an input interface and an output interface. The input interface is configured to obtain the data packet.

According to an eighth aspect, this application provides a computer-readable storage medium. The computer-readable storage medium stores computer instructions. When the computer instructions are run on a computer, the method according to any one of the first aspect or the possible implementations of the first aspect is performed, or the method according to any one of the second aspect or the possible implementations of the second aspect is performed.

According to a ninth aspect, this application provides a computer program product. The computer program product includes computer program code. When the computer program code is run on a computer, the method according to any one of the first aspect or the possible implementations of the first aspect is performed, or the method according to any one of the second aspect or the possible implementations of the second aspect is performed.

According to a tenth aspect, this application provides a wireless communication system, including the communication apparatus according to any one of the foregoing aspects or the possible implementations of the aspects.

DESCRIPTION OF EMBODIMENTS

Figure 1:
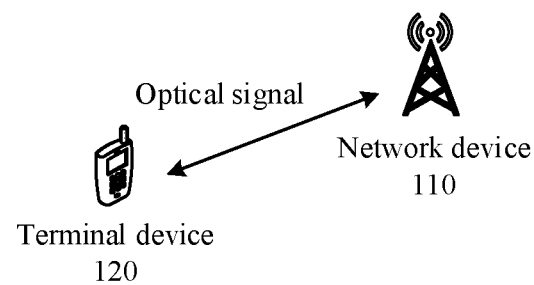
FIG. 1 is a schematic diagram of an architecture of a VLC system.

The following describes technical solutions of this application with reference to the accompanying drawings.

Technical solutions of embodiments of this application may be applied to a VLC system. In the VLC system, a white-light LED lamp may be selected as an illuminating light source and a signal emission source, to implement functions of illumination and communication at low costs.

In embodiments of this application, a communication technology used by the VLC system is not specifically limited, and may be, for example, a long term evolution (LTE) communication technology, an LTE frequency division duplex (FDD) communication technology, an LTE time division duplex (TDD) communication technology, a universal mobile telecommunication system (UMTS) communication technology, a worldwide interoperability for microwave access (WiMAX) communication technology, a 5th generation (5G) communication technology, and a future communication technology.

In embodiments of this application, a terminal device is a device that can receive and/or send an optical signal. The terminal device may also be referred to as user equipment (UE), a user, an access terminal, a subscriber unit, a subscriber station, a mobile station, a remote station, a remote terminal, a mobile device, a user terminal, a terminal, a wireless communication device, a user agent, a user apparatus, or the like. The terminal device may be a cellular phone, a smart watch, a wireless data card, a mobile phone, a tablet computer, a personal digital assistant (PDA) computer, a wireless modem, a handheld device, a laptop computer, a machine type communication (MTC) terminal, a computer with a wireless transceiver function, a virtual reality terminal device, an augmented reality terminal device, a wireless terminal in industrial control, a wireless terminal in driver-less driving, a wireless terminal in remote surgery, a wireless terminal in a smart grid, a wireless terminal in transportation security, a wireless terminal in smart city, a wireless terminal in smart home, or the like. In embodiments of this application, a specific technology and a specific device form used by the terminal device are not limited.

In embodiments of this application, a network device may be a device configured to communicate with the terminal device. In embodiments of this application, by controlling a light source, the network device may send an optical signal to the terminal device and/or receive an optical signal sent by the terminal device, thereby implementing wireless communication with the terminal device. The network device may be a base transceiver station (BTS) in a global system for mobile communication (GSM) system or code division multiple access (CDMA) system, a nodeB (NB) in a wideband code division multiple access (WCDMA) system, or an evolved nodeB (evolutional nodeB, eNB or eNodeB) in an LTE system, or may be a radio controller in a cloud radio access network (CRAN) scenario. Alternatively, the network device may be a regeneration station, an access point, a vehicle-mounted device, or a wearable device. Alternatively, the network device may be a terminal that assumes a function of a base station in D2D communication or machine communication. Alternatively, the network device may be a network device in a 5G network or a network device in a future evolved PLMN network. This is not limited in embodiments of this application. In addition, in embodiments of this application, the network device may alternatively be a module or a unit that completes some functions of a base station, and, for example, may be a central unit (CU) or may be a distributed unit (DU). In embodiments of this application, a specific technology and a specific device form used by the network device are not limited.

FIG. 1 is a schematic diagram of an architecture of a VLC system.

As shown in FIG. 1, the system may include at least one network device, for example, a network device 110 shown in FIG. 1. The communication system may further include at least one terminal device, for example, a terminal device 120 shown in FIG. 1. The network device and the terminal device may communicate through a wireless link by using an optical signal. The network device in FIG. 1 may transmit downlink data to the terminal device. After being modulated, the downlink data may be transmitted to the terminal device by using a light source (for example, an LED lamp). Correspondingly, the terminal device may also transmit uplink data to the network device. A name of the terminal device and a name of the network device may vary in systems using different technologies. For more specific description, refer to the foregoing description of a terminal device and a network device. Details are not described herein again.

The VLC system needs to complete both functions of illumination and communication, and the VLC system needs to be able to provide stable and reliable illumination and communication services in various scenarios (for example, in a shopping mall, an office building, a museum, a vicinity of a street lamp, a billboard, a playground, and a transportation vehicle) and environments (for example, at daytime, at night, and in rainy days). This poses requirements on luminance adjustability and communication reliability of the VLC system.

Therefore, how to ensure both the luminance adjustability and communication reliability of the VLC system becomes an issue that needs to be addressed urgently.

A solution is a luminance control solution based on a luminance compensation code. This solution uses an OOK modulation mode. In this way, luminance of an LED is directly related to a ratio of 0s to 1s in a sent information sequence. Specifically, a ratio of 0s to 1s in a to-be-sent data sequence needs to be calculated first, a ratio of 0s to 1s in a luminance compensation code is determined based on a luminance ratio of the VLC system, and then the luminance compensation code is combined with the to-be-sent data sequence to form a data packet, thereby implementing the functions of illumination and communication.

Luminance control is easily implemented by using this solution. However, the luminance compensation code added in this solution is a redundant sequence irrelevant to to-be-sent data. This reduces a code rate of the data packet and does not improve communication reliability of the VLC system.

Another solution is a luminance control solution based on cyclic redundancy check (CRC) code. This solution also uses the OOK modulation mode. Specifically, encoding by using forward error correction (FEC) code is performed on a to-be-sent data sequence, to obtain an FEC-encoded data sequence. Then CRC encoding is performed on the FEC-encoded data sequence to obtain a CRC check sequence. Luminance encoding is performed on the CRC check sequence based on a luminance ratio required by the VLC system, to obtain a luminance code block. In the luminance encoding, a length and a code rate for the luminance encoding need to be calculated by solving an equation set, and a mapping relationship between a luminance encoding codebook and the check sequence needs to be built based on the length and the code rate for the luminance encoding. Then the FEC-encoded data sequence and the luminance code block are combined to form a data packet, thereby implementing the functions of illumination and communication.

In this solution, CRC encoding is cascaded, to additionally provide a layer of encoding protection. This is conducive to improving reliability of the VLC system. However, a transmit end performs extra CRC encoding, and a receive end correspondingly needs to perform CRC decoding. This increases hardware complexity of the system. Luminance encoding increases computational complexity at the transmit end, and the receive end needs to know the luminance encoding codebook, but the codebook varies with the luminance ratio required by the VLC system. Therefore, the VLC system needs to allocate extra resources to enable the receive end and the transmit end to synchronously update the codebook. In summary, this solution increases hardware complexity of the VLC system.

It can be learned that the foregoing solutions cannot properly ensure luminance adjustability and communication reliability of the VLC system.

Embodiments of this application provide an information transmission method and a communication apparatus, which can properly ensure luminance adjustability and communication reliability of a VLC system.

Figure 2:
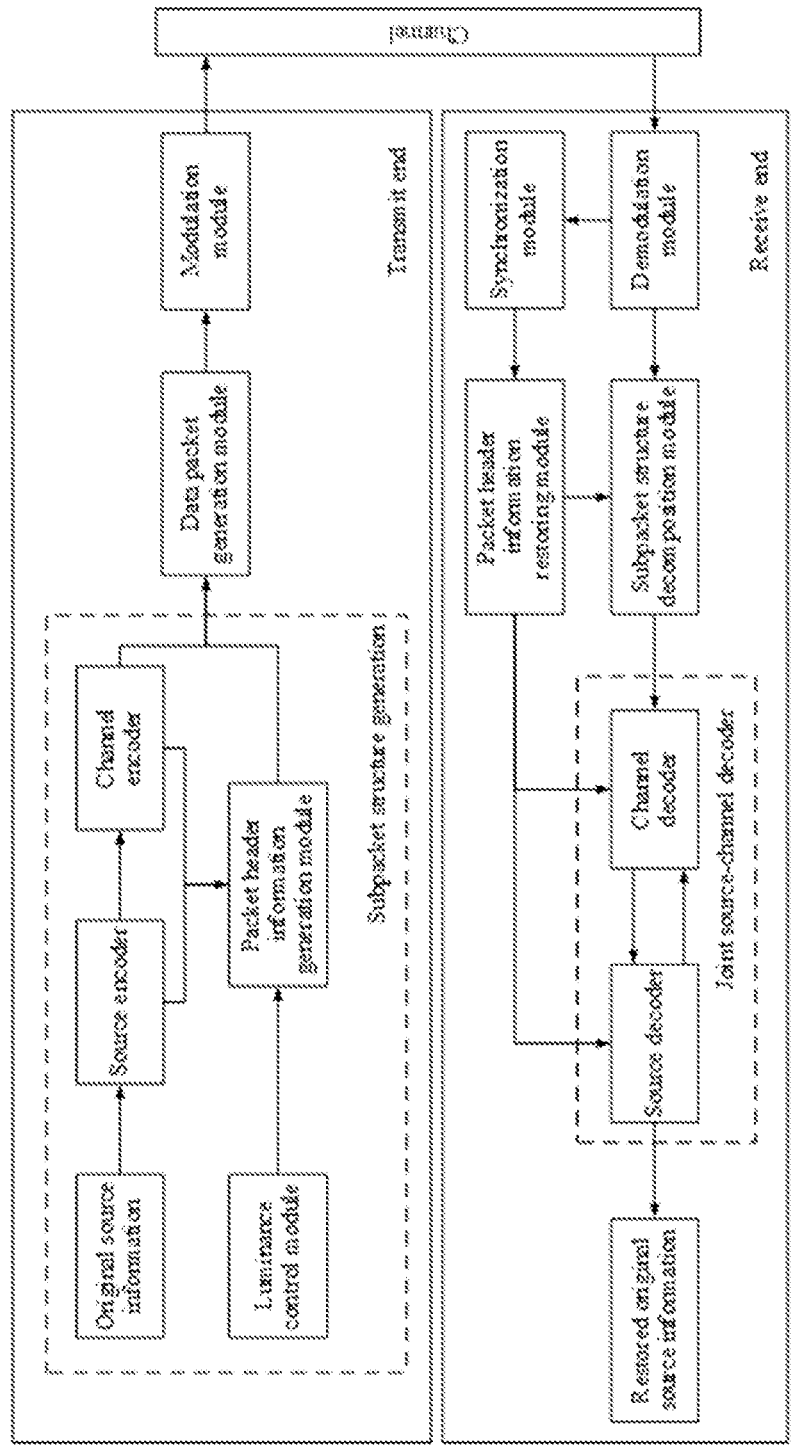
FIG. 2 is a schematic block diagram of a VLC system according to an embodiment of this application.

FIG. 2 is a schematic block diagram of a VLC system according to an embodiment of this application. A transmit end in FIG. 2 may correspond to the network device in FIG. 1, and a receive end may correspond to the terminal device in FIG. 1. Alternatively, the transmit end may correspond to the terminal device in FIG. 1, and the receive end may correspond to the network device in FIG. 1.

As shown in FIG. 2, the transmit end first performs source encoding on original source information by using a source encoder, and then sends source-encoded information to a channel encoder for channel encoding, to obtain channel-encoded information. Then a luminance control module is used to extract, from the original source information (not illustrated in FIG. 2) or the source-encoded information based on a luminance requirement of the VLC system, partial source information for luminance control, to obtain an information sequence used for luminance control. To facilitate the receive end in restoring the original source information, a packet header information generation module of the transmit end may generate packet header information. The packet header information includes information for indicating the partial source information, a code rate for the channel encoding, whether the transmit end has performed a bit flipping operation, and other information. Then a data packet generation module of the transmit end combines subpacket information, the channel-encoded information, and the information sequence used for luminance control, to form a to-be-sent data packet. Then a modulation module of the transmit end performs on-off keying (OOK) modulation on the to-be-sent data packet, and the to-be-sent data packet is sent by using an LED lamp.

The receive end first receives an optical signal from a channel by using an optical detector (for example, a photodiode), and converts the received optical signal into an electrical signal; further demodulates the obtained electrical signal by using a demodulation module, to obtain the data packet; restores the packet header information by using a synchronization module and a packet header information restoration module; decomposes, by using a subpacket structure decomposition module and the obtained packet header information, the data packet obtained through demodulation, to extract the information sequence used for luminance control and the channel-encoded information; and then performs joint source-channel decoding on the information sequence used for luminance control and the channel-encoded information, to restore the original source information.

In this embodiment of this application, the partial source information is used for luminance control. This can ensure to implement luminance adjustability of the VLC system. A transmit end additionally transmits the partial source information to a receive end, so that the receive end can obtain more information for restoring the original source information. This is conducive to decoding of the data packet, thereby improving communication reliability of the VLC system.

The following describes in detail an information transmission method provided in embodiments of this application.

Figure 3:
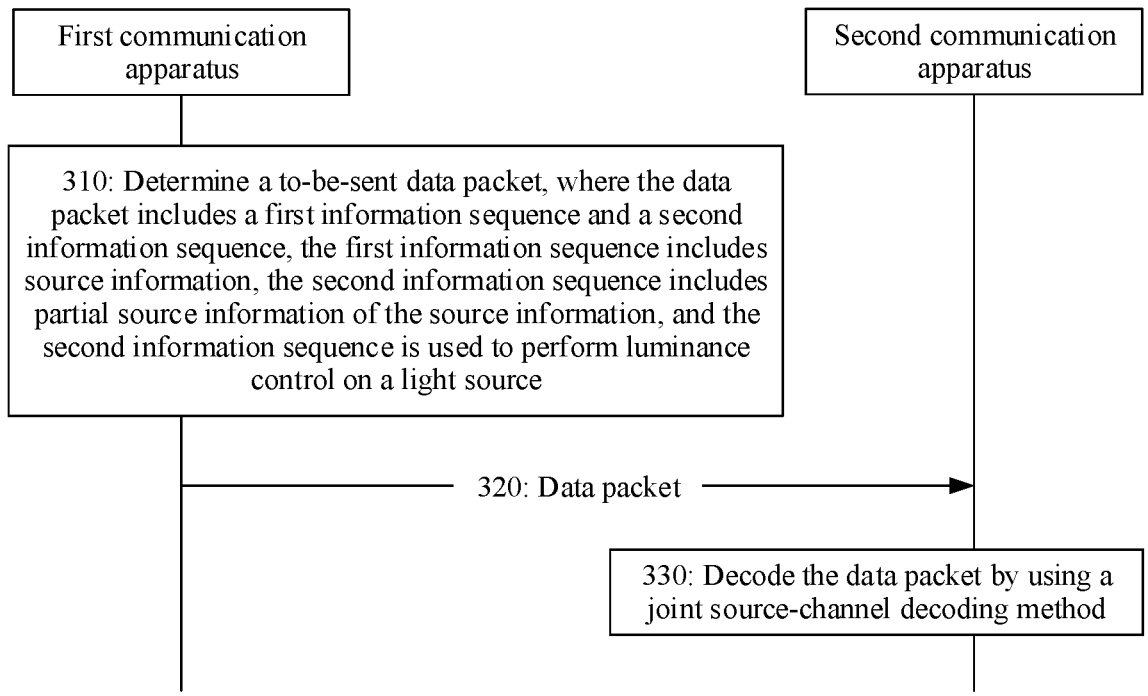
FIG. 3 is a schematic flowchart of an information transmission method according to an embodiment of this application.

FIG. 3 is a schematic flowchart of an information transmission method according to an embodiment of this application. In FIG. 3, a first communication apparatus is a transmit end and may correspond to the network device in FIG. 1 or a module or unit (for example, a chip, a circuit, or a system on chip (SoC)) in the network device in FIG. 1; and a second communication apparatus is a receive end and may correspond to the terminal device in FIG. 1 or a module or unit in the terminal device in FIG. 1.

The method shown in FIG. 3 may include at least some of the following content.

In step 310, the first communication apparatus determines a to-be-transmitted data packet.

A data packet may also be referred to as a physical-layer frame, which is uniformly referred to as a data packet in this application.

In this embodiment of this application, the to-be-transmitted data packet may include a first information sequence and a second information sequence. The first information sequence includes source information. The second information sequence is used for luminance control on a light source, and the second information sequence includes partial source information of the source information.

In other words, the to-be-transmitted data packet not only includes the source information that originally needs to be transmitted, but further includes the extra partial source information. The extra partial source information is also used for luminance control on the light source.

In this embodiment of this application, original source information and information that is obtained by performing source encoding on the original source information are collectively referred to as the source information. In other words, the source information may be the original source information, may be the information that is obtained by performing source encoding, or may be a combination of at least partial original source information and at least partial information that is obtained by performing source encoding.

In this embodiment of this application, the first information sequence may be information obtained after performing source encoding and/or channel encoding on the original source information. The first information sequence may alternatively be information obtained after performing joint source-channel encoding on the original source information. This is not specifically limited in this embodiment of this application.

A specific implementation of source encoding is not specifically limited in this embodiment of this application. For example, the first communication apparatus may perform at least one type of the following processing on the original source information: discrete cosine transform processing, quantizing processing, sorting processing, and compression processing. For another example, the first communication apparatus may perform matrix multiplication on the source information and a compression matrix to implement source encoding.

A specific implementation of channel encoding is not specifically limited in this embodiment of this application. For example, the first communication apparatus may use polar code, low density parity check (LDPC) code, Reed-Muller (RM) code, Reed-Solomon (RS) code, convolutional code, or another channel code.

A manner in which the first communication apparatus determines the to-be-sent data packet is not specifically limited in this embodiment of this application.

In some implementations, the first communication apparatus may obtain the first information sequence; determines the second information sequence based on the first information sequence, a preset luminance ratio, and the partial source information; and further determines the to-be-sent data packet based on the first information sequence and the second information sequence.

For example, the first communication apparatus may determine, based on a quantity of 1s in the first information sequence, a quantity of 0s in the first information sequence, and the preset luminance ratio, a quantity of 1s to be supplemented and a quantity of 0s to be supplemented; and further determine the second information sequence based on the quantity of 1s to be supplemented, the quantity of 0s to be supplemented, and the partial source information. The second information sequence can supplement the corresponding quantities of 1s and 0s.

For example, the first communication apparatus may determine a ratio of 0s to 1s in the second information sequence based on a ratio of 0s to 1s in the first information sequence and the preset luminance ratio, and further determine the second information sequence based on the ratio of 0s to 1s in the second information sequence and the partial source information. The second information sequence can supplement corresponding quantities of 1s and 0s.

The preset luminance ratio may be a luminance ratio required by a VLC system, thereby ensuring that a luminance change of the light source is imperceptible to a user during data transmission.

Optionally, after obtaining the first information sequence and the second information sequence, the first communication apparatus may further determine whether to perform a bit flipping operation on the first information sequence and the second information sequence. For example, the first communication apparatus may determine, based on the ratio of 0s to 1s in the first information sequence, whether to perform a bit flipping operation on the first information sequence and the second information sequence. For example, when the luminance ratio required by the system is high but a proportion of 0s in the first information sequence is large, a luminance ratio of the first information sequence is therefore lower than the luminance ratio required by the system. In this case, the first communication apparatus may supplement a small quantity of 0s by using the second information sequence, to increase a total proportion of 0s in the first information sequence and the second information sequence. Then a bit flipping operation is performed on the first information sequence and the second information sequence, so that the first information sequence and the second information sequence include a large quantity of 1s, thereby increasing overall luminance ratios of both the first information sequence and the second information sequence. In this way, a length of the second information sequence can be reduced. This is conducive to improving a code rate of the data packet.

A manner for obtaining the partial source information is not specifically limited in this embodiment of this application.

For example, the partial source information may be a specific part of the source information. When the first communication apparatus needs to determine the to-be-sent data packet, the first communication apparatus may directly obtain the specific part for luminance control.

For another example, the first communication apparatus may chunk the source information, to obtain at least one subblock; and further select at least one target subblock from the at least one subblock based on a quantity of 1s in each of the at least one subblock, a quantity of 0s in each subblock, the quantity of 1s to be supplemented, and the quantity of 0s to be supplemented, or based on a quantity of 1s in each of the at least one subblock, a quantity of 0s in each subblock, and the ratio of 0s to 1s in the second information sequence. The at least one target subblock is the partial source information.

After obtaining the first information sequence and the second information sequence, the first communication apparatus may combine the first information sequence and the second information sequence, to form the to-be-sent data packet.

In some implementations, to facilitate the receive end in restoring the original source information, the first communication apparatus may add first information to the to-be-sent data packet, to indicate the partial source information included in the second information sequence.

For example, the first communication apparatus may add a sequence number and/or a quantity of the at least one target subblock to the data packet.

In some implementations, the to-be-sent data packet may further include a ratio of 0s to 1s in the source information.

Figure 4:
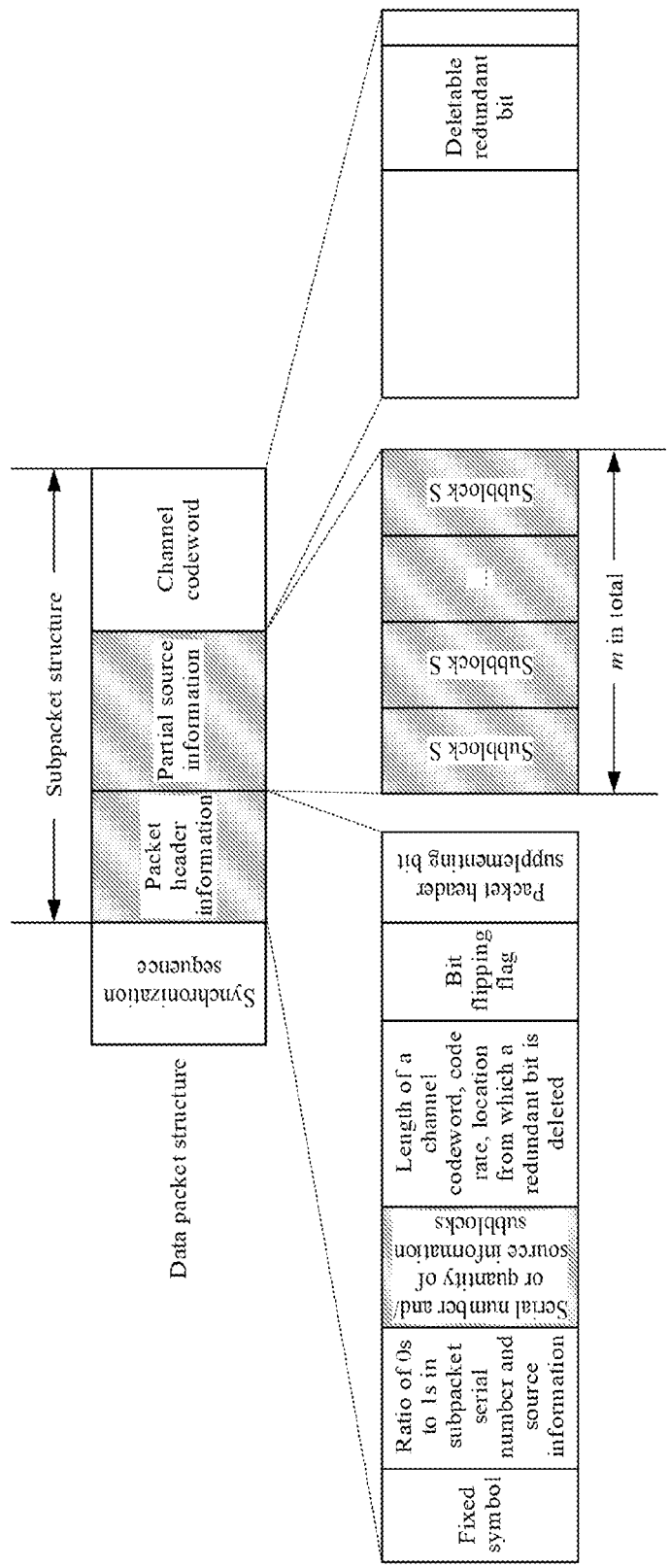
FIG. 4 is a schematic diagram of a structure of a data packet according to an embodiment of this application.

FIG. 4 is a schematic diagram of a structure of a data packet according to an embodiment of this application. As shown in FIG. 4, the data packet includes, without being limited to, a synchronization sequence, packet header information, a first information sequence, and a second information sequence. The packet header information, the first information sequence, and the second information sequence form a subpacket structure. The structure of the data packet shown in FIG. 4 includes only one subpacket structure.

(1) The data packet starts with the synchronization sequence. The synchronization sequence is used for packet synchronization, clock synchronization, and phase synchronization in a demodulation process.

(2) The packet header information is obtained by performing channel encoding on subpacket structure information. The subpacket structure information includes at least some of the following content: a fixed symbol, a long/short packet structure flag, a subpacket serial number, a ratio of 0s to 1s in source information, a packet header supplementing bit, a sequence number of at least one target subblock, a quantity of the at least one target subblock, a ratio of 0s to 1s in each of the at least one target subblock, a length of a subblock, a ratio of 0s to 1s in each of at least one subblock, a length of a channel codeword, a code rate, a location from which a redundant bit is deleted, and whether to perform bit flipping. The fixed symbol is used to identify a packet header information portion, and the packet header supplementing bit is used to adjust a ratio of 0s to 1s in the packet header information portion.

Optionally, the subpacket structure information may further include a ratio of 0s to 1s in each subblock.

(3) The partial source information corresponds to the foregoing second information sequence. In the example in FIG. 4, the partial source information includes m subblocks S.

(4) The channel codeword corresponds to the foregoing first information sequence. Optionally, the channel codeword further includes a deletable redundant bit.

In some implementations, the data packet may further include a source compression mode. For example, the field is used to indicate whether to use one or more of the following methods for compression: discrete cosine transform, wavelet transform, entropy encoding, sparse matrix multiplication, and the like.

It should be noted that FIG. 4 is merely an example. Locations of portions shown in FIG. 4 may change. For example, a location of the partial source information and a location of the channel codeword can be exchanged. For another example, except a location of the fixed symbol, locations of other symbols in the packet header information also can be exchanged.

Figure 5:
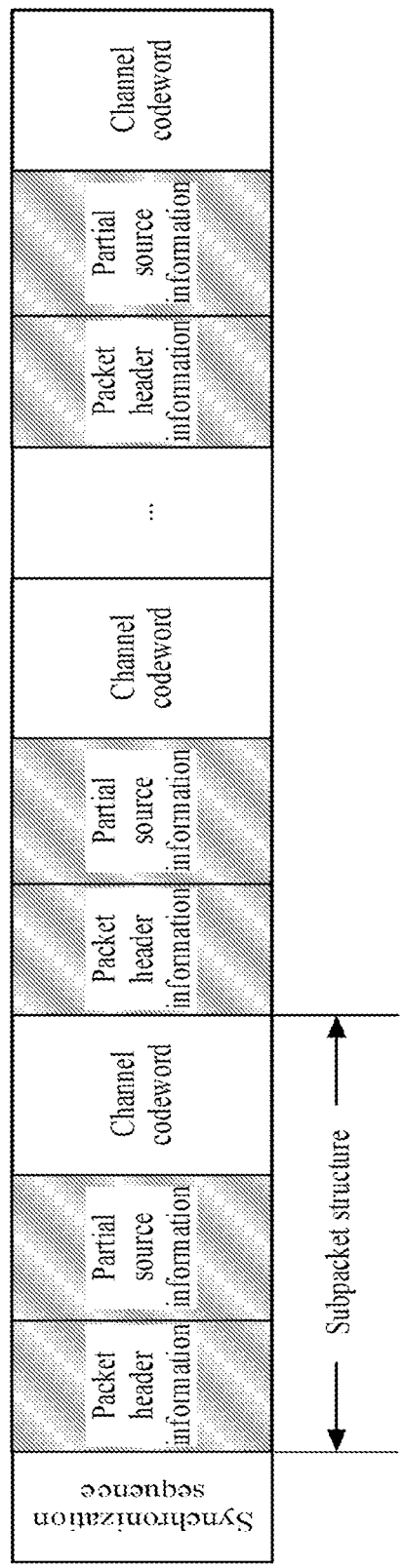
FIG. 5 is a schematic diagram of another structure of a data packet according to an embodiment of this application.

FIG. 5 is a schematic diagram of another structure of a data packet according to an embodiment of this application. The structure of the data packet shown in FIG. 5 includes a plurality of subpacket structures. The plurality of subpacket structures may be directly connected to each other, or may be inserted into another fixed sequence. The subpacket structures in FIG. 5 are similar to the subpacket structure in FIG. 4. Reference may be made to related descriptions of FIG. 4.

In step 320, the first communication apparatus sends the data packet determined in step 310 to the second communication apparatus by using the light source. Correspondingly, the second communication apparatus receives the data packet sent by the first communication apparatus.

In some implementations, the first communication apparatus performs OOK modulation on the data packet, thereby sending the data packet by using the light source. The second communication apparatus converts an optical signal received from a channel into an electrical signal and performs demodulation to obtain the data packet.

In step 330, the second communication apparatus decodes the received data packet by using a joint source-channel decoding method.

In some implementations, the second communication apparatus performs operations such as packet synchronization, clock synchronization, and phase synchronization by using a synchronization sequence in the data packet; performs subpacket synchronization by using a fixed symbol in the data packet, counts a quantity of subpackets in the entire data packet, and extracts each subpacket; decodes packet header information to obtain subpacket structure information; extracts partial source information and a channel codeword in a subpacket based on the subpacket structure information, and also determines, based on the subpacket structure information, whether to perform a bit flipping operation on the partial source information and the channel codeword; and performs joint source-channel decoding on the obtained partial source information and channel codeword, to restore the original source information.

It should be noted that when the first communication apparatus in FIG. 3 corresponds to a terminal device and the second communication apparatus corresponds to a network device, an information transmission method is similar to the information transmission method used when the first communication apparatus corresponds to a network device and the second communication apparatus corresponds to a terminal device. Details are not described herein again.

Figure 6A:
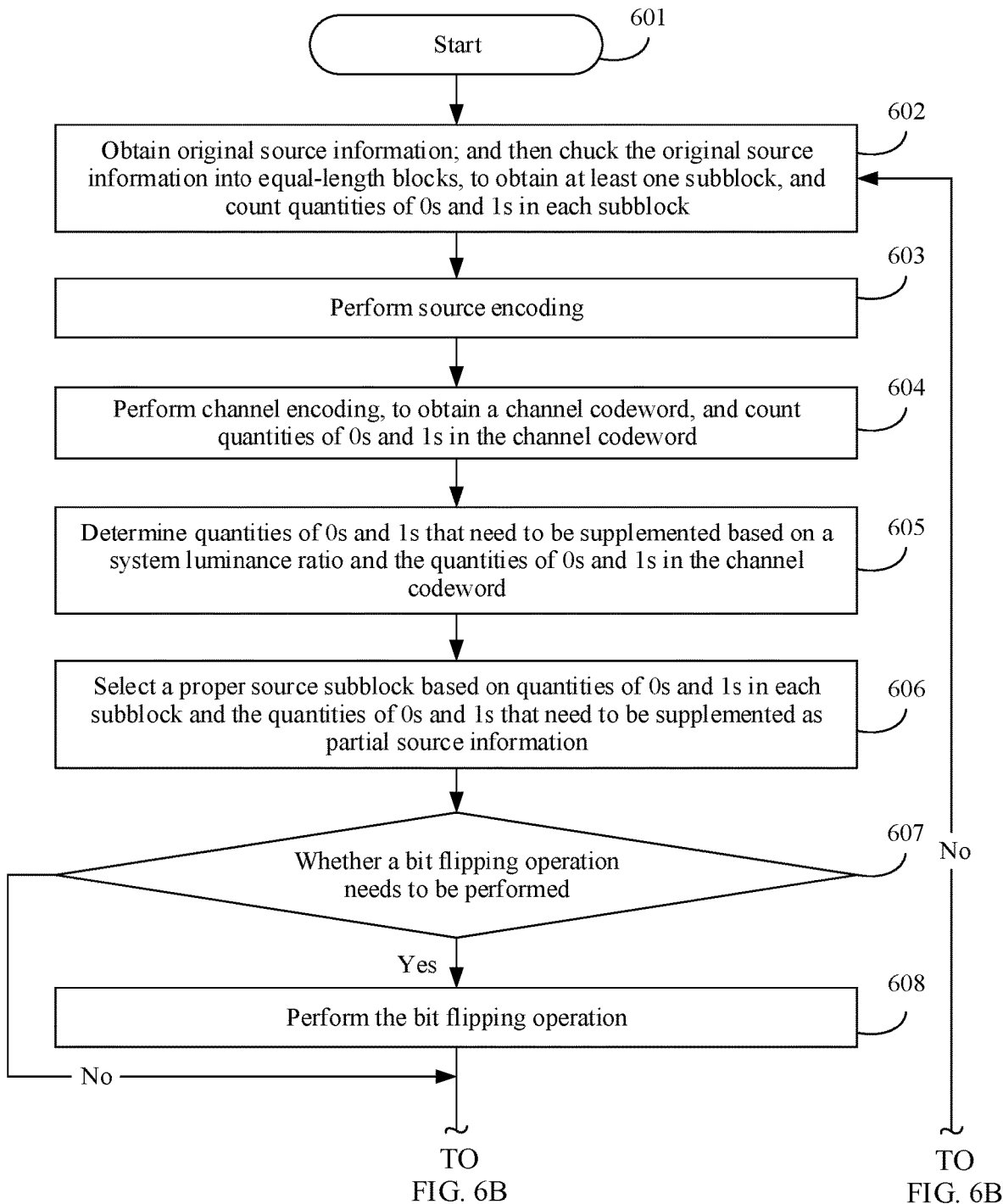
FIG. 6A and FIG. 6B are a schematic diagram of an encoding process.
Figure 6B:
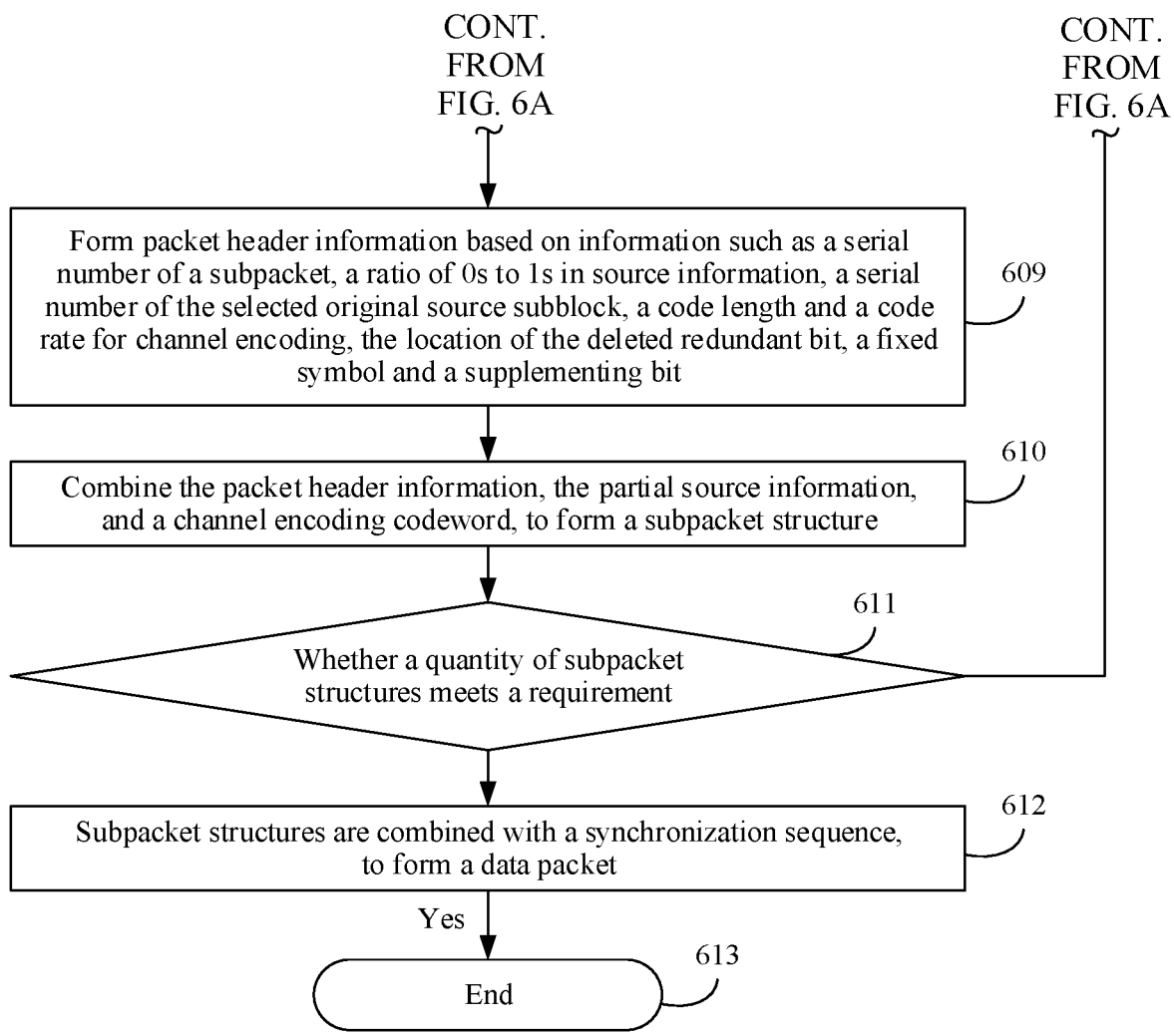
Figure 7:
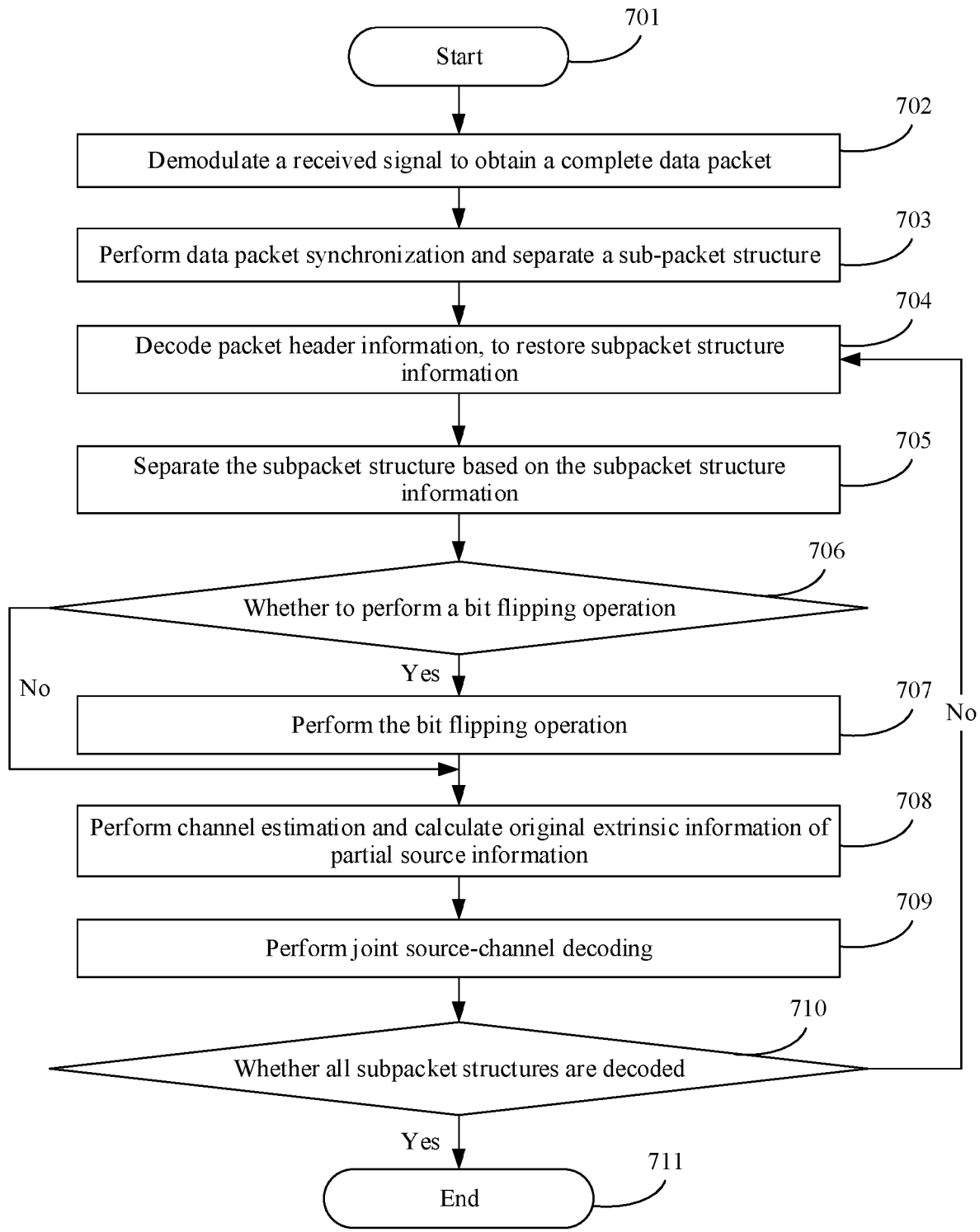
FIG. 7 is a schematic diagram of a decoding process.

The following describes in detail a possible process of an information transmission method in embodiments of this application with reference to FIG. 6A, FIG. 6B, and FIG. 7. FIG. 6A, FIG. 6B, and FIG. 7 are an example process of the information transmission method provided in embodiments of this application. FIG. 6A and FIG. 6B are a schematic diagram of an encoding process. FIG. 7 is a schematic diagram of a decoding process.

The process in FIG. 6A and FIG. 6B may be performed by a first communication apparatus.

As shown in FIG. 6A and FIG. 6B, in step 601, a setting is initialized, to set a serial number of a subpacket to zero.

In step 602, original source information is obtained; and then the original source information is chunked into equal-length blocks, to obtain at least one subblock, and quantities of 0s and 1s in each subblock are counted, where the serial number of the subpacket increments by 1.

In step 603, the original source information is encoded, to obtain a source codeword.

In step 604, the source codeword is encoded, to obtain a channel codeword, and quantities of 0s and 1s in the channel codeword are counted.

Optionally, if a redundant bit needs to be deleted from the channel codeword, a location of the deleted redundant bit needs to be recorded.

In step 605, quantities of 0s and 1s that need to be supplemented are determined based on a luminance ratio of a VLC system and the quantities of 0s and 1s in the channel codeword.

In step 606, a proper source subblock is selected based on quantities of 0s and 1s in each subblock and the quantities of 0s and 1s that need to be supplemented, and serves as partial source information.

In step 607, whether a bit flipping operation needs to be performed is determined based on the partial source information, the quantities of 0s and 1s in the channel codeword, and the luminance ratio of the VLC system, where the bit flipping operation flips a ratio of 0s to 1s. When a bit flipping operation needs to be performed, perform step 608. When a bit flipping operation does not need to be performed, perform step 609.

In step 608, a bit flipping operation is performed on the partial source information and the channel codeword.

In step 609, subpacket structure information is generated based on information such as a serial number of a subpacket, a ratio of 0s to 1s in source information, a serial number of the selected source subblock, a code length and a code rate for channel encoding, and the location of the deleted redundant bit; channel encoding is performed on the subpacket structure information; and then a result of the encoding is combined with a fixed symbol and a supplementing bit to form packet header information.

In step 610, the packet header information, the partial source information, and the channel codeword are combined to form a subpacket structure.

In step 611, whether a quantity of subpackets meets a packet length requirement is determined. If the structure of the data packet shown in FIG. 4 is used, a quantity of subpacket structures is 1. If the structure of the data packet shown in FIG. 5 is used, a quantity of subpacket structures is N, and N is an integer greater than 1. If the quantity of subpacket structures meets the requirement, perform step 612. Otherwise, return to step 602.

In step 612, a synchronization sequence is combined with each subpacket structure, to form a data packet.

In step 613, the process is completed, and the data packet is sent to a subsequent module.

The process in FIG. 7 may be performed by a second communication apparatus.

As shown in FIG. 7, in step 701, an optical signal is received, and the optical signal is converted into an electrical domain signal by using a photodiode or a photodetector, to prepare for a decoding operation.

In step 702, the electrical domain signal is demodulated, to obtain a complete data packet.

In step 703, operations such as packet synchronization, clock synchronization, and phase synchronization are performed by using a synchronization sequence in the data packet; and subpacket synchronization is completed by using a fixed symbol in packet header information of the data packet, a quantity of subpacket structures in the data packet is counted, and each subpacket structure is extracted.

In step 704, the packet header information is decoded, to restore subpacket structure information.

In step 705, the subpacket structure is separated based on the subpacket structure information, to obtain partial source information and a channel codeword.

In step 706, whether a bit flipping operation needs to be performed on the partial source information and the channel codeword is determined based on the subpacket structure information. If a bit flipping operation needs to be performed, perform step 707. Otherwise, perform step 708.

In step 707, a bit flipping operation is performed on the partial source information and the channel codeword.

In step 708, channel estimation is performed by using the synchronization sequence in the data packet or a fixed symbol in the subpacket structure, and original extrinsic information of the partial source information is calculated based on a result of the channel estimation and a ratio of 0s to 1s in source information in the subpacket structure information.

In step 709, joint source-channel decoding is performed on the original extrinsic information of the partial source information and the channel codeword.

In step 710, after the decoding is completed, whether all subpacket structures are decoded is determined. If all the subpacket structures are decoded, perform step 711. Otherwise, return to step 704.

In step 711, original source information is restored.

The following describes the information transmission method in embodiments of this application with reference to specific examples.

Example 1

Figure 8:
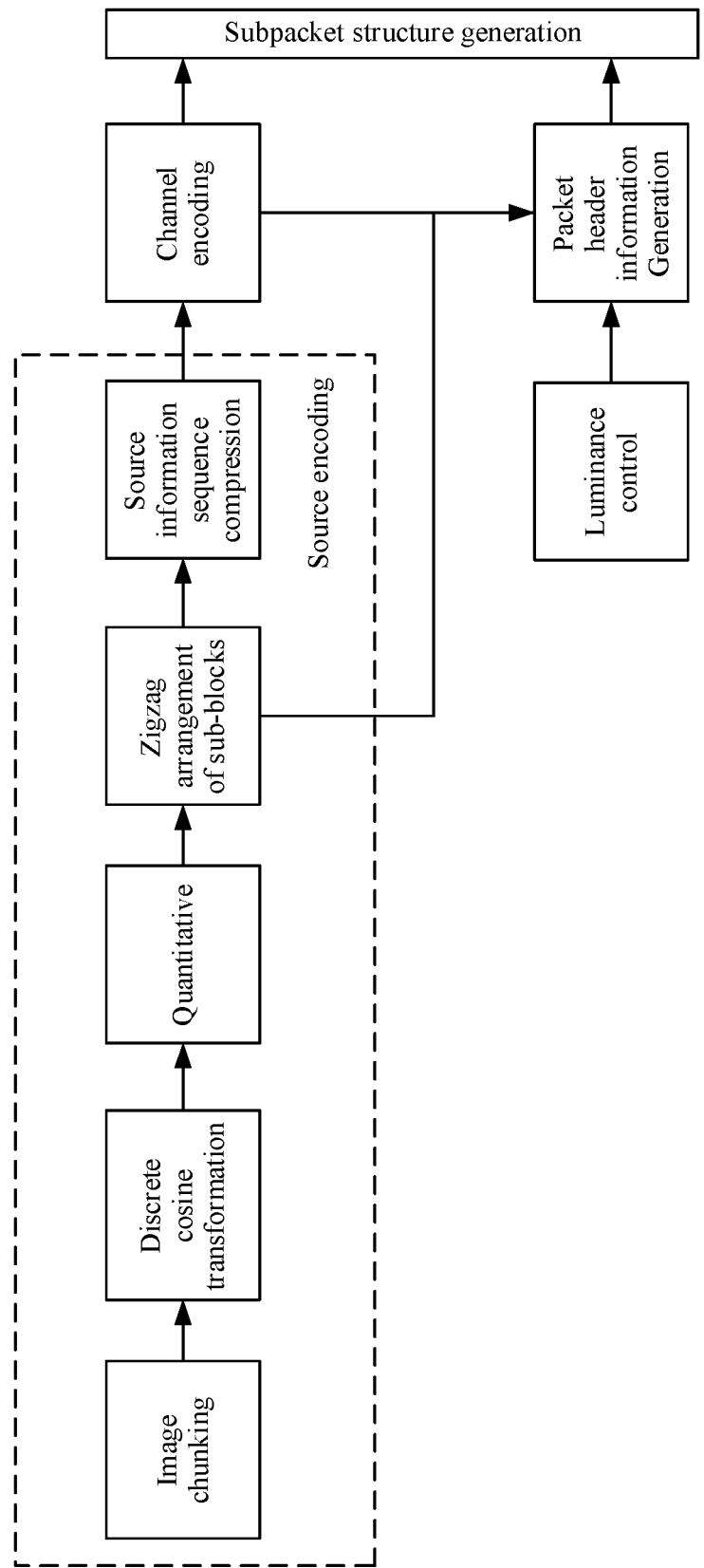
FIG. 8 is a schematic flowchart of generating a subpacket structure according to an embodiment of this application.

This example is a joint source encoding-luminance solution for image data. For a system framework of the solution, refer to the system framework shown in FIG. 2. A specific manner for generating a subpacket structure in a to-be-sent data packet is shown in FIG. 8.

It should be noted that in this example, picture data and video data are collectively referred to as image data.

Figure 9:
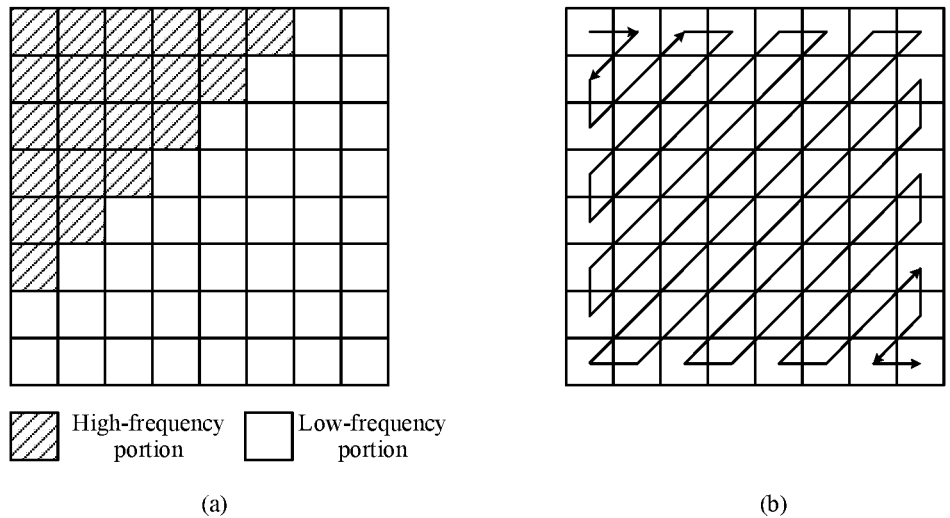
FIG. 9 is a schematic diagram of a data representation form of image information after quantization and zigzag arrangement of the image information.

(I) Transmit End (1) After image data undergoes operations such as chunking, discrete cosine transform, and quantizing, data is clearly divided into two categories: high frequency and low frequency. A high-frequency portion has a large quantity of 0 bits, and a low-frequency portion has a large quantity of 1 bits. As shown in (a) in FIG. 9, from a perspective of a two-dimensional matrix, a low-frequency portion is near the upper-left corner of the matrix. In other words, more image data is concentrated in the upper-left corner of the matrix. As shown in (b) in FIG. 9, a zigzag arrangement manner is used, to convert a quantization matrix of image data into a one-dimensional source sequence. In this case, image data concentrates in a header subblock of a source information sequence S, and a trailer subblock mostly includes all-0 bits. Therefore, a ratio of 0s to 1s in each subblock of the source information sequence S need to be counted.

The source information sequence S is compressed, and source encoding is completed for the entire picture data, to obtain a source codeword. In this example, an entropy encoding solution such as a Huffman encoding method may be used to compress the source information sequence S, or another source information sequence compression method may be used.

(2) Then channel encoding is performed on the source codeword, to obtain a channel codeword C. In this example, polar code, LDPC code, RM code, RS code, convolutional code, or another channel encoding method may be used.

Further, if a code rate for encoding may be changed by deleting a redundant bit from the channel codeword, a location of the deleted redundant bit needs to be recorded.

(3) Then quantities of 0s and 1s in the channel codeword are counted, and quantities of 0s and 1s that need to be supplemented are calculated by using the following formula based on a system luminance ratio, the quantities of 0s and 1s in the channel codeword, and a length of a source information subblock:

$$\begin{cases} R_{Dim} = \dfrac{PS_1 + CS_1}{PS_1 + PS_0 + CS_1 + CS_0} \\ R_{PS} = PS_1 / PS_0 \end{cases}$$

In the formula, $R_{Dim}$ is the system luminance ratio, $CS_1$ is the quantity of 1s in the channel codeword, $CS_0$ is the quantity of 0s in the channel codeword, $PS_1$ is the quantity of 1 bits that need to be supplemented, $PS_0$ is the quantity of 0 bits that need to be supplemented, and $R_{PS}$ is ratio of 0s that need to be added to is that need to be added.

The source information subblock is determined based on $R_{PS}$ and a ratio of 0s to 1s in the source information subblock.

Then a number m of repetitions of the source information subblock is determined based on the length K of the source information subblock, where m meets the following formula:

$PS_1 + PS_0 \approx mK$, $1 \leq m < N$

Finally, the repeated source information subblocks form partial source information.

(4) If it is determined that a bit flipping operation needs to be performed, ratios of 0s to 1s in the partial information and the channel codeword may be changed by using the bit flipping operation. A luminance ratio obtained after the bit flipping operation meets the following formula:

$R_{Dim}^{After} = 1 - R_{Dim}$

In the formula, $R_{Dim}^{After}$ is the luminance ratio obtained after the bit flipping operation.

(5) Subpacket structure information is formed by using information such as the ratio of 0s to 1s in each subblock of the source information sequence S, a serial number of a selected source subblock, the number of repetitions, a code length and a code rate for channel encoding, the location of the deleted redundant bit, and whether a bit flipping operation is used. The subpacket structure information may be encoded by using polar code, RM code, RS code, or another error correction encoding method. Then a result of the encoding, a fixed symbol, and a packet header supplementing bit are combined to form packet header information.

(6) The packet header information, the partial source information, and the channel codeword are combined, to form a subpacket structure. A single subpacket structure or a plurality of subpacket structures is or are combined with a synchronization sequence, to form a data packet.

(II) Receive End (1) Demodulation and synchronization need to be performed for received information, and a subpacket structure is extracted. Packet header information is decoded, to obtain information such as distribution of 0s and 1s in source information, a serial number of a subblock in the source information, a code rate and a code length for channel encoding, and a location of a deleted redundant bit, to facilitate a subsequent decoding operation.

(2) Channel estimation is performed by using an inherent symbol in a data packet. For example, channel estimation is performed by using a synchronization sequence or a fixed symbol.

(3) Original extrinsic information that respectively corresponds to a channel codeword, partial source information, and a source bit not transmitted by using a channel is calculated.

Specifically, it is assumed that a probability that 0s appear in the source information is $p_0$, and a probability that is appear in the source information is $p_1$. It is also assumed that an SNR value of a channel can be obtained through channel estimation. Then noise power can be obtained according to the following formula:

$$SNR = E_b / N_0 = \dfrac{1}{\sigma^2}$$

The receive end may calculate $p_0$ and $p_1$ by using a ratio of 0s to 1s in a source subblock included in the packet header information.

It is assumed that the receive end obtains a received signal $r_j$, which corresponds to a jth signal $b_j$ sent by the transmit end. The receive end may determine, based on whether a log-likelihood value obtained through calculation according to the following formula is positive or negative, whether a restored signal $\hat{b}_j$ equals to 0 or 1.

$$L(\hat{b}_j) = \qquad\qquad\qquad\qquad\qquad\text{(Formula 5)}$$
$$\log\left(\dfrac{P(b_j=0 \mid r_j)}{P(b_j=1 \mid r_j)}\right) = \log\left(\dfrac{P(r_j \mid b_j=0)}{P(r_j \mid b_j=1)}\right) + \log\left(\dfrac{P(b_j=0)}{P(b_j=1)}\right) =$$
$$\dfrac{1-2r_j}{\sigma^2} + \log\left(\dfrac{P(b_j=0)}{P(b_j=1)}\right)$$

When $b_j$ is partial bits of the channel codeword, $P(b_j=0)=P(b_j=1)$. In this case, original extrinsic information thereof is as follows:

$$L(\hat{b}_j) = \dfrac{1-2r_j}{\sigma^2}$$

When $b_j$ is a bit of the partial source information, original extrinsic information thereof is as follows:

$$L(\hat{b}_j) = \dfrac{1-2r_j}{\sigma^2} + \log\left(\dfrac{p_0}{p_1}\right)$$

Original extrinsic information of a source information bit not transmitted by using a channel is as follows:

$$L(\hat{b}_j) = \log\left(\dfrac{p_0}{p_1}\right)$$

In the formula, $$\log\left(\frac{p_0}{p_1}\right)$$

is defined as source side information.

(4) After the original extrinsic information that corresponds to the channel codeword, the partial source information, and the source bit not transmitted by using a channel is obtained, a decoding operation is completed by using a source-channel iterative decoding method.

A specific decoding method may use a Chase-like decoding algorithm, a BCJR algorithm, a belief propagationalgorithm, Viterbit decoding, a maximum-likelihooddecoding algorithm, or the like.

A specific process is as follows: channel decoding is first performed. Then source soft decoding is performed by using software information obtained after the channel decoding, and extrinsic information obtained through source decoding is fed back to a channel decoder for channel decoding again. After repeated iteration between the channel decoder and a source decoder, a bit sequence obtained by hard decision based on a source soft decoding is finally output, where the sequence is restored image data.

(5) After the decoding is completed, whether all subpacket structures in the data packet are decoded is determined. If all the subpacket structures are decoded, all image data obtained through decoding is output. Otherwise, operations such as extraction of a subpacket structure, packet header information decoding, and joint source-channel decoding are repeated.

In this example, the system luminance ratio can be adjusted by using the source information subblock based on different distributions of 0s and 1s in high-frequency data and low-frequency data of the image data. In addition, in the data packet, the partial source information and the channel codeword are combined and transmitted together. This is conducive for the receive end to use a joint source-channel encoding method.

Example 2

This example is a joint source-channel-luminance control solution based on a matrix compression method.

Unlike the case in example 1, in this example, source compression is performed by using a sequence matrix multiplication method at a transmit end. A specific source compression method is shown in the following formula:

$$SI * H_{SC} = SC$$

In the formula, $H_{SC}$ is a matrix for source compression.

It is assumed that source information SI is a 1×L sequence, and $H_{SC}$ is an L×M matrix. It can be learned that SC is a 1×M source codeword sequence. Therefore, when M<L, source compression is completed.

The $H_{SC}$ matrix may be an LDPC code check matrix, a sparse generation matrix, a polar code generation matrix, or another matrix form.

Figure 10:
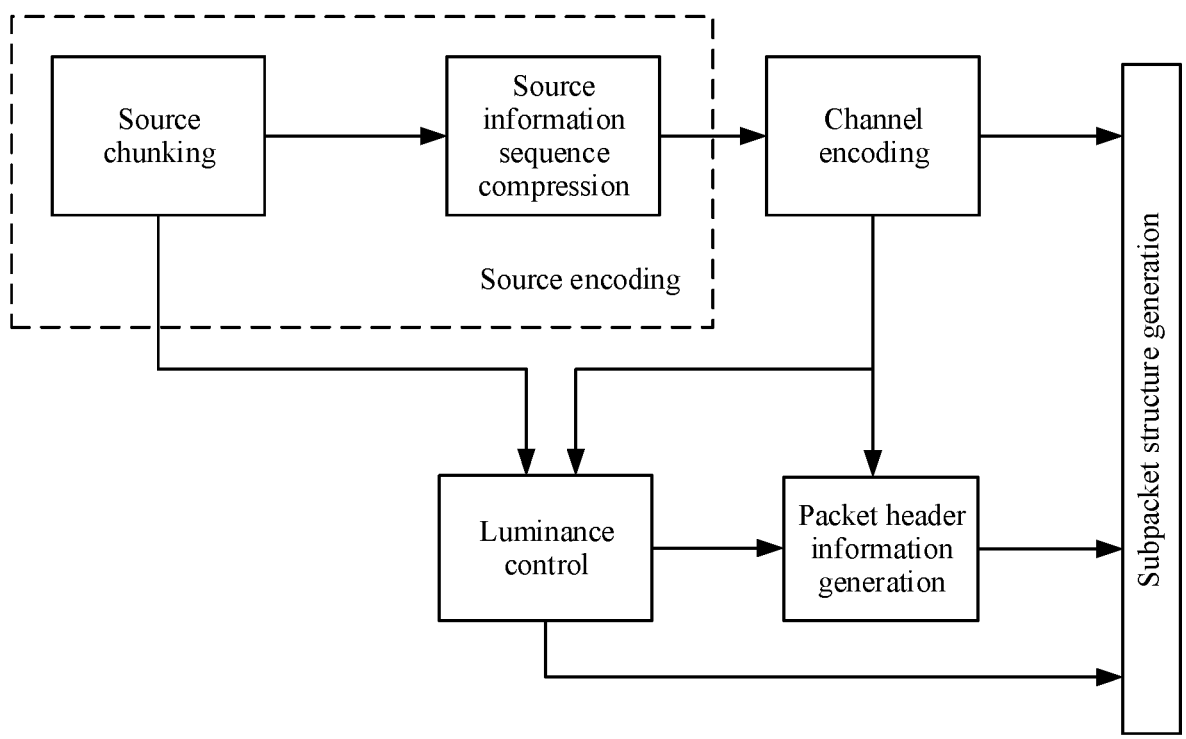
FIG. 10 is another schematic flowchart of generating a subpacket structure according to an embodiment of this application.

Therefore, in this example, a source encoding operation in a subpacket structure generation stage is simplified, and includes only two steps: source chunking and source information sequence compression. A specific subpacket structure generation method is shown in FIG. 10.

A receive end may also use a joint source-channel decoding method. For specific descriptions, refer to example 1. Details are not described herein again.

In this example, source compression is completed by multiplying a matrix and a source information sequence, and a system luminance ratio is adjusted by using partial source information. In addition, in a data packet, partial source information and a channel codeword are combined and transmitted together. This is conducive for the receive end to use a joint source-channel encoding method.

The foregoing describes in detail the information transmission method provided in this application. The following describes a communication apparatus provided in this application.

It can be understood that, to implement the functions in the foregoing embodiments, the communication apparatus includes a corresponding hardware structure and/or a software module that implement/implements each function. A person skilled in the art should be easily aware that, in combination with the units and the method steps in the examples described in embodiments disclosed in this application, this application can be implemented by hardware or a combination of hardware and computer software. Whether a function is performed by hardware or hardware driven by computer software depends on particular application scenarios and design constraints of the technical solutions.

Figure 11:
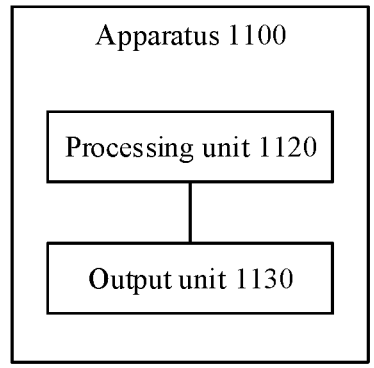
FIG. 11 is a schematic block diagram of a communication apparatus according to an embodiment of this application.

FIG. 11 is a schematic block diagram of a communication apparatus according to an embodiment of this application. The apparatus 1100 has functional modules that implement a method performed by the first communication apparatus in the foregoing method embodiments. Specifically, the apparatus 1100 includes a processing unit 1120 and an output unit 1130.

The processing unit 1120 is configured to determine a to-be-sent data packet, where the data packet includes a first information sequence and a second information sequence, the first information sequence includes source information, the second information sequence includes partial source information of the source information, and the second information sequence is used to perform luminance control on a light source.

The output unit 1130 is configured to output the data packet by using the light source.

Optionally, the processing unit 1120 is specifically configured to: obtain the first information sequence; determine the second information sequence based on the first information sequence, a preset luminance ratio, and the partial source information; and determine the data packet based on the first information sequence and the second information sequence.

Optionally, the processing unit 1120 is specifically configured to: determine, based on a quantity of 1s in the first information sequence, a quantity of 0s in the first information sequence, and the luminance ratio, a quantity of 1s to be supplemented and a quantity of 0s to be supplemented; and determine the second information sequence based on the quantity of 1s to be supplemented, the quantity of 0s to be supplemented, and the partial source information, where the second information sequence is used to supplement the 1s to be supplemented and the 0s to be supplemented.

Optionally, the processing unit 1120 is further configured to: chunk the source information, to obtain at least one subblock; and select at least one target subblock from the at least one subblock based on a quantity of 1s in each of the at least one subblock, a quantity of 0s in each subblock, the quantity of 1s to be supplemented, and the quantity of 0s to be supplemented, where the at least one target subblock includes the partial source information.

Optionally, the data packet further includes a synchronization sequence, a ratio of 0s to 1s in the source information, and packet header information, where the packet header information includes a sequence number of each of the at least one target subblock and/or a quantity of the at least one target subblock.

Optionally, the processing unit 1120 is specifically configured to: obtain the source information; and perform source encoding and channel encoding on the source information to obtain the first information sequence.

Optionally, the processing unit 1120 is specifically configured to: perform at least one type of the following processing on the source information: discrete cosine transform processing, quantizing processing, sorting processing, and compression processing; or perform a matrix multiplication operation on the source information and a compression matrix.

Optionally, the source information is image information.

In the foregoing implementations, the processing unit 1120 may be implemented by using a processor, and the output unit 1130 may be implemented by using a transmitter.

Optionally, the transmitter may be disposed separately, or may be a part of a transceiver that has receiving and sending functions, which is not limited herein.

Optionally, for example, the communication apparatus 1100 may be the first communication apparatus in the method embodiments.

Optionally, for another example, the communication apparatus 1100 may be a chip or an integrated circuit installed in the first communication apparatus. In this case, the output unit 1130 may be a communication interface or an interface circuit. For example, the output unit 1130 is an output interface or an output circuit.

In each example, the processing unit 1120 is configured to perform processing and/or an operation, except sending and receiving actions, implemented internally by the first communication apparatus.

Optionally, the processing unit 1120 may be a processing apparatus. A function of the processing apparatus may be implemented by hardware, or may be implemented by hardware executing corresponding software. For example, the processing apparatus may include at least one processor and at least one memory. The at least one memory is configured to store a computer program. The at least one processor reads and executes the computer program stored in the at least one memory, to enable the communication apparatus 1100 to perform an operation and/or processing performed by the first communication apparatus in each method embodiment.

Optionally, the processing apparatus may include only a processor, and the memory configured to store the computer program is located outside the processing apparatus. The processor is connected to the memory by using a circuit or an electrical wire, to read and execute the computer program stored in the memory.

In some examples, the processing apparatus may further be a chip or an integrated circuit. For example, the processing apparatus includes a processing circuit/logical circuit and an interface circuit. The processing circuit/logical circuit is configured to perform the determining processing performed by the first communication apparatus in each method embodiment, to obtain the to-be-sent data packet. The interface circuit is configured to output the data packet by using the light source.

For more detailed descriptions of the processing unit 1120 and the output unit 1130, directly refer to related descriptions in the foregoing method embodiments. Details are not described herein again.

Figure 12:
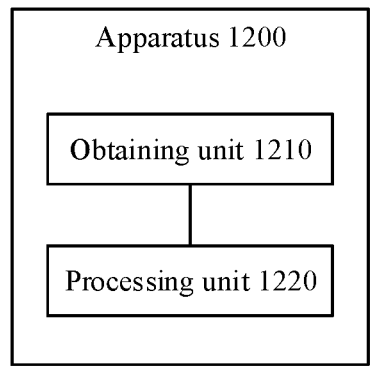
FIG. 12 is a schematic block diagram of a communication apparatus according to another embodiment of this application.

FIG. 12 is a schematic block diagram of a communication apparatus according to another embodiment of this application. The apparatus 1200 has functional modules that implement a method performed by the second communication apparatus in the foregoing method embodiments. Specifically, the apparatus 1200 includes an obtaining unit 1210 and a processing unit 1220.

The obtaining unit 1210 is configured to obtain a data packet transmitted by using a light source, where the data packet includes a first information sequence and a second information sequence, the first information sequence includes source information, the second information sequence includes partial source information of the source information, and the second information sequence is used to assist in decoding.

The processing unit 1220 is configured to decode the data packet by using a joint source-channel decoding method.

Optionally, the data packet further includes a synchronization sequence, a ratio of 0s to 1s in the source information, and packet header information. The packet header information includes a sequence number of each of at least one target subblock and/or a quantity of the at least one target subblock, and the at least one target subblock includes the partial source information.

Optionally, the source information is image information.

In the foregoing implementations, the obtaining unit 1210 may be implemented by using a receiver.

Optionally, the receiver may be disposed separately, or may be a part of a transceiver that has receiving and sending functions, which is not limited herein.

Optionally, for example, the communication apparatus 1200 may be the second communication apparatus in the method embodiments.

Optionally, for another example, the communication apparatus 1200 may be a chip or an integrated circuit installed in the second communication apparatus. In this case, the obtaining unit 1210 may be a communication interface or an interface circuit. For example, the obtaining unit 730 is an input interface or an input circuit.

In each example, the processing unit 1220 is configured to perform processing and/or an operation, except sending and receiving actions, implemented internally by the second communication apparatus.

Optionally, the processing unit 1220 may be a processing apparatus. A function of the processing apparatus may be implemented by hardware, or may be implemented by hardware executing corresponding software. For example, the processing apparatus may include at least one processor and at least one memory. The at least one memory is configured to store a computer program. The at least one processor reads and executes the computer program stored in the at least one memory, to enable the communication apparatus 1200 to perform an operation and/or processing performed by the second communication apparatus in each method embodiment.

Optionally, the processing apparatus may include only a processor, and the memory configured to store the computer program is located outside the processing apparatus. The processor is connected to the memory by using a circuit or an electrical wire, to read and execute the computer program stored in the memory.

In some examples, the processing apparatus may further be a chip or an integrated circuit. For example, the processing apparatus includes a processing circuit/logical circuit and an interface circuit. The interface circuit is configured to input the data packet. The processing circuit/logical circuit is configured to perform the decoding processing performed by the second communication apparatus in each method embodiment.

For more detailed descriptions of the obtaining unit 1210 and the processing unit 1220, directly refer to related descriptions in the foregoing method embodiments. Details are not described herein again.

Figure 13:
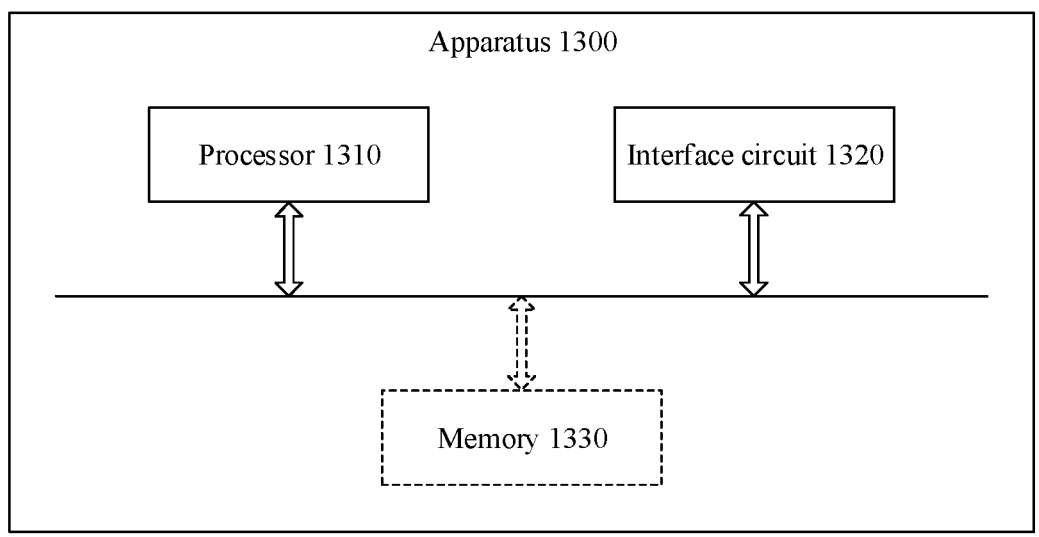
FIG. 13 is a schematic diagram of a structure of a communication apparatus according to another embodiment of this application.

FIG. 13 is a schematic diagram of a structure of a communication apparatus according to another embodiment of this application. As shown in FIG. 13, the apparatus 1300 includes one or more processors 1310 and one or more interface circuits 1320. The processor 1310 and the interface circuit 1320 are coupled to each other. It can be understood that the interface circuit 1320 may be a transceiver or an input/output interface. Optionally, the apparatus 1300 may further include one or more memories 1330, configured to store instructions executed by the processor 1310, store input data required by the processor 1310 to execute the instructions, or store data generated after the processor 1310 executes the instructions.

When the apparatus 1300 is configured to implement a function of the first communication apparatus in the method embodiments, the processor 1310 is configured to perform a function of the processing unit 1120, and the interface circuit 1320 is configured to perform a function of the output unit 1130.

In an implementation, the apparatus 1300 may be the first communication apparatus in the method embodiments.

Figure 14:
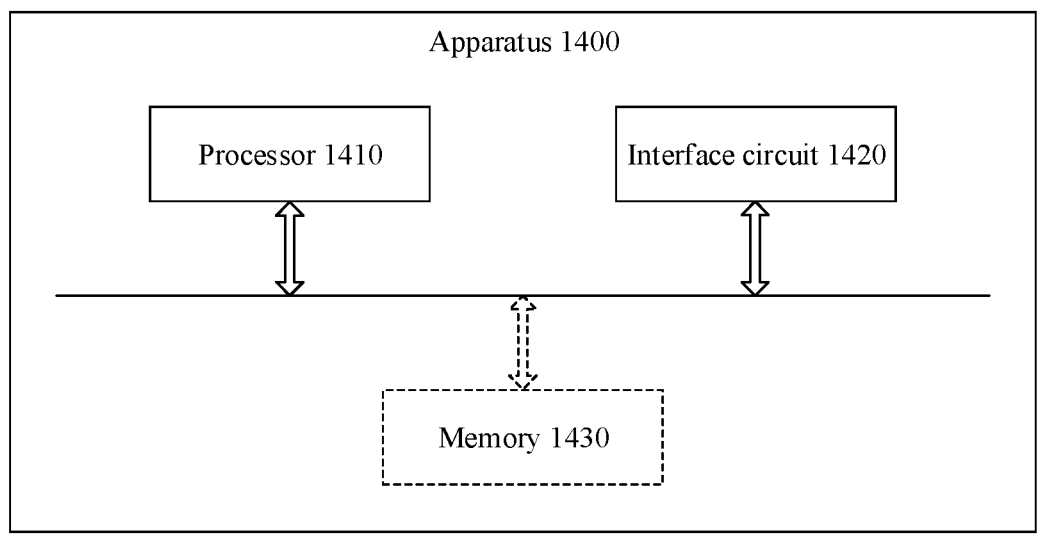
FIG. 14 is a schematic diagram of a structure of a communication apparatus according to another embodiment of this application.

FIG. 14 is a schematic diagram of a structure of a communication apparatus according to another embodiment of this application. As shown in FIG. 14, the apparatus 1400 includes one or more processors 1410 and one or more interface circuits 1420. The processor 1410 and the interface circuit 1420 are coupled to each other. It can be understood that the interface circuit 1420 may be a transceiver or an input/output interface. Optionally, the apparatus 1400 may further include one or more memories 1430, configured to store instructions executed by the processor 1410, store input data required by the processor 1410 to execute the instructions, or store data generated after the processor 1410 executes the instructions.

When the apparatus 1400 is configured to implement a function of the second communication apparatus in the method embodiments, the interface circuit 1210 is configured to perform a function of the obtaining unit 1210, and the processor 1410 is configured to perform a function of the processing unit 1220.

In an implementation, the apparatus 1400 may be the second communication apparatus in the method embodiments.

Optionally, in each apparatus embodiment, the memory and the processor may be units that are physically independent of each other, or the memory and the processor may be integrated together. This is not limited in this application.

In addition, this application further provides a computer-readable storage medium. The computer-readable storage medium stores computer instructions. When the computer instructions are run on a computer, an operation and/or processing performed by the first communication apparatus in each method embodiment of this application are/is performed.

This application further provides a computer-readable storage medium. The computer-readable storage medium stores computer instructions. When the computer instructions are run on a computer, an operation and/or processing performed by the second communication apparatus in each method embodiment of this application are/is performed.

In addition, this application further provides a computer program product. The computer program product includes computer program code or instructions. When the computer program code or instructions are run on a computer, an operation and/or processing performed by the first communication apparatus in each method embodiment of this application are/is performed.

This application further provides a computer program product. The computer program product includes computer program code or instructions. When the computer program code or instructions are run on a computer, an operation and/or processing performed by the second communication apparatus in each method embodiment of this application are/is performed.

In addition, this application further provides a chip. The chip includes a processor. A memory configured to store a computer program is disposed independent of the chip. The processor is configured to execute the computer program stored in the memory, so that a first communication apparatus in which the chip is installed performs an operation and/or processing performed by the first communication apparatus in any method embodiment.

Further, the chip may include a communication interface. The communication interface may be an input/output interface, may be an interface circuit, or the like. Further, the chip may include the memory.

This application further provides a chip. The chip includes a processor. A memory configured to store a computer program is disposed independent of the chip. The processor is configured to execute the computer program stored in the memory, so that a second communication apparatus in which the chip is installed performs an operation and/or processing performed by the second communication apparatus in any method embodiment.

Further, the chip may include a communication interface. The communication interface may be an input/output interface, may be an interface circuit, or the like. Further, the chip may include the memory.

In addition, this application further provides a communication apparatus (which, for example, may be a chip), including a processor and a communication interface. The communication interface is configured to receive a signal and transmit the signal to the processor. The processor processes the signal, so that an operation and/or processing performed by the first communication apparatus in any method embodiment are/is performed.

In this application further provides a communication apparatus (which, for example, may be a chip), including a processor and a communication interface. The communication interface is configured to receive a signal and transmit the signal to the processor. The processor processes the signal, so that an operation and/or processing performed by the second communication apparatus in any method embodiment are/is performed.

In addition, this application further provides a communication apparatus, including at least one processor. The at least one processor is coupled to at least one memory. The at least one processor is configured to execute a computer program or instructions stored in the at least one memory, so that an operation and/or processing performed by the first communication apparatus in any method embodiment are/is performed.

This application further provides a communication apparatus, including at least one processor. The at least one processor is coupled to at least one memory. The at least one processor is configured to execute a computer program or instructions stored in the at least one memory, so that an operation and/or processing performed by the second communication apparatus in any method embodiment are/is performed.

In addition, this application further provides a communication apparatus, including a processor, a memory, and a transceiver. The memory is configured to store a computer program. The processor is configured to call and run the computer program stored in the memory, and control the transceiver to send and receive signals, so that the first communication apparatus performs an operation and/or processing performed by the first communication apparatus in any method embodiment.

This application further provides a communication apparatus, including a processor, a memory, and a transceiver. The memory is configured to store a computer program. The processor is configured to call and run the computer program stored in the memory, and control the transceiver to send and receive signals, so that the second communication apparatus performs an operation and/or processing performed by the second communication apparatus in any method embodiment.

In addition, this application further provides a wireless communication system, including the first communication apparatus and the second communication apparatus in embodiments of this application.

A processor in embodiments of this application may be an integrated circuit chip that has a signal processing capability. In an implementation process, steps in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA), another programmable logic device, a discrete gate, a transistor logic device, or a discrete hardware component. The general-purpose processor may be a microprocessor, or the processor may be any conventional processor or the like. The steps of the methods disclosed in embodiments of this application may be directly presented as being performed and completed by a hardware encoding processor, or performed and completed by a combination of hardware and a software module in an encoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

The memory in the embodiments of this application may be a volatile memory or a nonvolatile memory, or may include a volatile memory and a nonvolatile memory. The memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DRRAM). It should be noted that the memory in the system and the method described in this specification is intended to include, but not limited to, these memories and any memory of another proper type.

A person of ordinary skill in the art may be aware that, in combination with the examples described in embodiments disclosed in this specification, units and algorithm steps be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed systems, apparatuses, and methods may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in the embodiments of this application may be integrated into one processing unit, or each of the units may exist alone physically, or two or more units may be integrated into one unit.

The term "and/or" in this application describes only an association relationship for describing associated objects and represents that three relationships may exist. For example, A and/or B may represent the following three cases: only A exists, both A and B exist, and only B exists. A, B, and C each may be singular or plural. This is not limited.

In embodiments of this application, serial numbers such as "first" and "second" are used to distinguish between same items or similar items that have basically the same functions and purposes. A person skilled in the art may understand that "first" and "second" do not limit a quantity or a sequence, and "first", "second", and the like do not indicate a definite difference.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An information transmission method, comprising:
    determining a data packet, wherein the data packet comprises a first information sequence, a second information sequence, and a packet header information, the first information sequence comprises source information, the second information sequence comprises partial source information of the source information for performing luminance control on a light source, and the packet header information comprises: (1) a sequence number of each of at least one target subblock or (2) a quantity of the at least one target subblock, and wherein the at least one target subblock comprises the partial source information; and
    outputting the data packet by using the light source, wherein determining the data packet comprises:
        obtaining the first information sequence;
        determining the second information sequence based on the first information sequence, a preset luminance ratio, and the partial source information; and
        determining the data packet based on the first information sequence and the second information sequence, and
    wherein determining the second information sequence based on the first information sequence, the preset luminance ratio, and the partial source information comprises:
        determining, based on a quantity of 1s in the first information sequence, a quantity of 0s in the first information sequence, and the preset luminance ratio, a quantity of 1s to be supplemented and a quantity of 0s to be supplemented.

2. The method according to claim 1, wherein the determining the second information sequence based on the first information sequence, a preset luminance ratio, and the partial source information further comprises:
    determining the second information sequence based on the quantity of 1s to be supplemented, the quantity of 0s to be supplemented, and the partial source information, wherein the second information sequence is used to supplement the 1s to be supplemented and the 0s to be supplemented.

3. The method according to claim 2, wherein the method further comprises:
    obtaining at least one subblock based on the source information; and
    selecting at least one target subblock from the at least one subblock based on a quantity of 1s in each of the at least one subblock, a quantity of 0s in each subblock, the quantity of 1s to be supplemented, and the quantity of 0s to be supplemented, wherein the at least one target subblock comprises the partial source information.

4. The method according to claim 3, wherein the data packet further comprises a synchronization sequence and a ratio of 0s to 1s in the source information.

5. The method according to claim 1, wherein the obtaining the first information sequence comprises:
    obtaining the source information; and
    performing source encoding and channel encoding on the source information to obtain the first information sequence.

6. The method according to claim 5, wherein the performing source encoding on the source information comprises:
    performing at least one type of the following processing on the source information: discrete cosine transform processing, quantizing processing, sorting processing, and compression processing; or
    performing a matrix multiplication operation on the source information and a compression matrix.

7. The method according to claim 1, wherein the source information is image information.

8. An information transmission method, comprising:
    obtaining a data packet transmitted by using a light source, wherein the data packet comprises a first information sequence, a second information sequence, and a packet header information, the first information sequence comprises source information, the second information sequence comprises partial source information of the source information for performing luminance control on a light source, and the packet header information comprises: (1) a sequence number of each of at least one target subblock or (2) a quantity of the at least one target subblock, and wherein the at least one target subblock comprises the partial source information, wherein the data packet is determined based on performing operations comprising:
        obtaining the first information sequence;
        determining the second information sequence based on the first information sequence, a preset luminance ratio, and the partial source information; and
        determining the data packet based on the first information sequence and the second information sequence, and
    wherein determining the second information sequence based on the first information sequence, the preset luminance ratio, and the partial source information comprises:
        determining, based on a quantity of 1s in the first information sequence, a quantity of 0s in the first information sequence, and the preset luminance ratio, a quantity of 1s to be supplemented and a quantity of 0s to be supplemented; and
        decoding the data packet by using a joint source-channel decoding method.

9. The method according to claim 8, wherein the data packet further comprises a synchronization sequence and a ratio of 0s to 1s in the source information, and wherein the at least one target subblock comprises the partial source information.

10. The method according to claim 8, wherein the source information is image information.

11. A communication apparatus, comprising:

at least one processor; and one or more memories coupled to the at least one processor and storing programming instructions for execution by the at least one processor to:

determine a data packet, wherein the data packet comprises a first information sequence, a second information sequence, and a packet header information, the first information sequence comprises source information, the second information sequence comprises partial source information of the source information for performing luminance control on a light source, and the packet header information comprises: (1) a sequence number of each of at least one target subblock or (2) a quantity of the at least one target subblock, and wherein the at least one target subblock comprises the partial source information; and cause the data packet to be output by using the light source, wherein determining the data packet comprises:

obtaining the first information sequence;

determining the second information sequence based on the first information sequence, a preset luminance ratio, and the partial source information; and determining the data packet based on the first information sequence and the second information sequence, and wherein determining the second information sequence based on the first information sequence, the preset luminance ratio, and the partial source information comprises:

determining, based on a quantity of 1s in the first information sequence, a quantity of 0s in the first information sequence, and the preset luminance ratio, a quantity of Is to be supplemented and a quantity of 0s to be supplemented.

12. The apparatus according to claim 11, the programming instructions are for execution by the at least one processor to:

determine the second information sequence based on the quantity of 1s to be supplemented, the quantity of 0s to be supplemented, and the partial source information, wherein the second information sequence is used to supplement the Is to be supplemented and the 0s to be supplemented.

13. The apparatus according to claim 12, the programming instructions are for execution by the at least one processor to:

obtain at least one subblock based on the source information; and select at least one target subblock from the at least one subblock based on a quantity of 1s in each of the at least one subblock, a quantity of 0s in each subblock, the quantity of 1s to be supplemented, and the quantity of 0s to be supplemented, wherein the at least one target subblock comprises the partial source information.

14. The apparatus according to claim 13, wherein the data packet further comprises a synchronization sequence and a ratio of 0s to 1s in the source information.

15. The apparatus according to claim 11, the programming instructions are for execution by the at least one processor to:

obtain the source information; and perform source encoding and channel encoding on the source information to obtain the first information sequence.

16. The apparatus according to claim 15, the programming instructions are for execution by the at least one processor to:

perform at least one type of the following processing on the source information: discrete cosine transform processing, quantizing processing, sorting processing, and compression processing; or perform a matrix multiplication operation on the source information and a compression matrix.

17. The apparatus according to claim 11, wherein the source information is image information.

* * * * *